United States Patent

Cobb et al.

[11] Patent Number: 6,087,054
[45] Date of Patent: Jul. 11, 2000

[54] DETECTION AND CORRECTION OF SKEW BETWEEN A REFERENCE AND LENTICULES IN LENTICULAR MATERIAL

[75] Inventors: Joshua M. Cobb, Victor; Andrea S. Rivers, Bloomfield; Jeffrey R. Hawver, Rochester, all of N.Y.

[73] Assignee: Eastman Kodak Company, Rochester, N.Y.

[21] Appl. No.: 09/217,030

[22] Filed: Dec. 21, 1998

[51] Int. Cl.[7] .................................................. G03C 9/00
[52] U.S. Cl. ........................... 430/30; 430/22; 430/946; 355/22; 355/33; 355/77
[58] Field of Search ............................. 430/22, 30, 946; 355/22, 33, 77

[56] References Cited

U.S. PATENT DOCUMENTS

| | | | |
|---|---|---|---|
| 3,534,164 | 10/1970 | Glenn, Jr. ................................ | 348/44 |
| 5,681,676 | 10/1997 | Telfer et al. . | |
| 5,689,340 | 11/1997 | Young ..................................... | 356/401 |
| 5,697,006 | 12/1997 | Taguchi et al. . | |
| 5,812,152 | 9/1998 | Torigoe et al. .............................. | 347/2 |

Primary Examiner—John A. McPherson
Attorney, Agent, or Firm—William F. Noval

[57] ABSTRACT

A lenticular image product is formed from a lenticular material having an array of cylindrical lenses and a photographic emulsion coated thereon, by scanning the lenticular material with an intensity modulated first beam of light in a direction parallel to the long axes of the cylindrical lenses to form a latent lenticular image in the photographic emulsion. A second beam of light having a wavelength outside of the range of sensitivity of the photographic emulsion is focused into two distinct spots or a line both with a width smaller than the pitch of the cylindrical lenses onto the lenticular material. The lenticular material is moved through the beam in a direction perpendicular to the axes of the cylindrical lenses to provide a page scan motion of the lenticular material and to modulate the angle of reflection or refraction of the second beam of light. The position of the angularly modulated second beam of light is sensed at two locations along the long axes of the lenticules to generate a skew correction signal to control the alignment of a writing beam to the lenticular material.

23 Claims, 8 Drawing Sheets

DETECTION AND CORRECTION OF SKEW BETWEEN A REFERENCE AND LENTICULES IN LENTICULAR MATERIAL

FIELD OF THE INVENTION

The invention relates generally to the field of manufacturing lenticular images and more particularly to detecting and measuring the relative skew of a writing laser beam to lenticular material which is used for producing the lenticular images. More specifically, the invention relates to the detection and correction of any skew between the writing laser beam and the lenticules as the material is transported in a scanning laser printer.

BACKGROUND OF THE INVENTION

Lenticular images include an array of cylindrical lenses in a lenticular material and a sequence of spatially multiplexed images that are viewed through the lenticular material so that different ones of the multiplexed images are viewed at different angles by the viewer. One image effect produced by the lenticular image is a depth or stereoscopic image where the lenticules are oriented vertically and one eye views one image of a stereo pair or sequence from one angle and the other eye views another image from the stereo pair. Another image effect is a motion image where different images in a motion image sequence are viewed by both eyes, while changing the angle at which the image is viewed. In this image effect the lenticules are oriented in the horizontal direction and the lenticular material is rotated about the long axis of the lenticules. Other effects that combine these two effects, or form collages of unrelated images that can be viewed from different viewing angles can be provided.

It has been proposed to create stereoscopic images by providing a lenticular material having a color photographic emulsion thereon. The stereoscopic images are exposed onto the lenticular material by a laser scanner and the material is processed to produce the lenticular image product. See for example, U.S. Pat. No. 5,697,006, issued Dec. 9, 1997, inventors Taguchi et al.

The image that is exposed on the lenticular material must be very precisely positioned under each lenticule. If the separate image lines produced by the writing laser beam of the laser scanner and the lenticules on the material are not aligned parallel, the resulting skew misalignment will degrade the image quality. There is a need therefore for an improved manufacturing process for making lenticular image products from lenticular material of the type having a lenticular lens array coated with photographic emulsion.

It is known to scan a non actinic laser beam across a lenticular array in a direction perpendicular to the axes of the lenticules, and to sense the deflection of the beam by the lenticules to produce an output clock for modulating a writing laser beam. See U.S. Pat. No. 5,681,676, issued Oct. 28, 1997, inventors Telfer et al.

It is one object of this invention to provide a method and apparatus for detecting and/or measuring any variation of lenticular skew relative to the writing laser beam for the purpose of printing accurate images on the material. It is another object of the invention to provide a method and apparatus for minimizing such variations during manufacture of a lenticular image product.

SUMMARY OF THE INVENTION

The present invention is directed to overcoming one or more of the problems set forth above. Briefly summarized, according to one aspect of the present invention, a lenticular image product is formed from a lenticular material having an array of cylindrical lenses and a photographic emulsion coated thereon, by scanning the lenticular material with an intensity modulated first beam of light in a direction parallel to the long axes of the cylindrical lenses to form a latent lenticular image in the photographic emulsion. A second beam of light having a wavelength outside of the range of sensitivity of the photographic emulsion is focused into a spot smaller than the pitch of the cylindrical lenses onto the lenticular material. The lenticular material is moved through the beam to provide a page scan motion across the short axes of the lenticules of the material and to modulate the angle of reflection or refraction of the second beam of light caused by the lenticules. The position of the angularly modulated second beam of light is sensed at two separated points along the long axes of a lenticule and the sensed positions are used to control the rotational position of a pivoting cylinder mirror assembly. As a result, the skew between the writing laser beam and the long axes of the cylindrical lens is minimized and the parallel alignment of the writing laser beam to the lenticule is maintained.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The invention provides an accurate method for either mapping lenticular skew or detecting skew variations which can be compensated in a laser printer, thereby enabling efficient production of high quality lenticular image products using lenticular material having photographic emulsion coated thereon.

BRIEF DESCRIPTION OF THE DRAWINGS

FIG. 5 shows the skew misalignment of the writing laser beam 22 and second beam 38 with respect to the lenticules and the refracted second beam 33 as it impinges onto detectors 44 and 44a.

To facilitate understanding, identical reference numerals have been used, where possible, to designate identical elements that are common to the Figures.

DETAILED DESCRIPTION OF THE INVENTION

Figure 1:
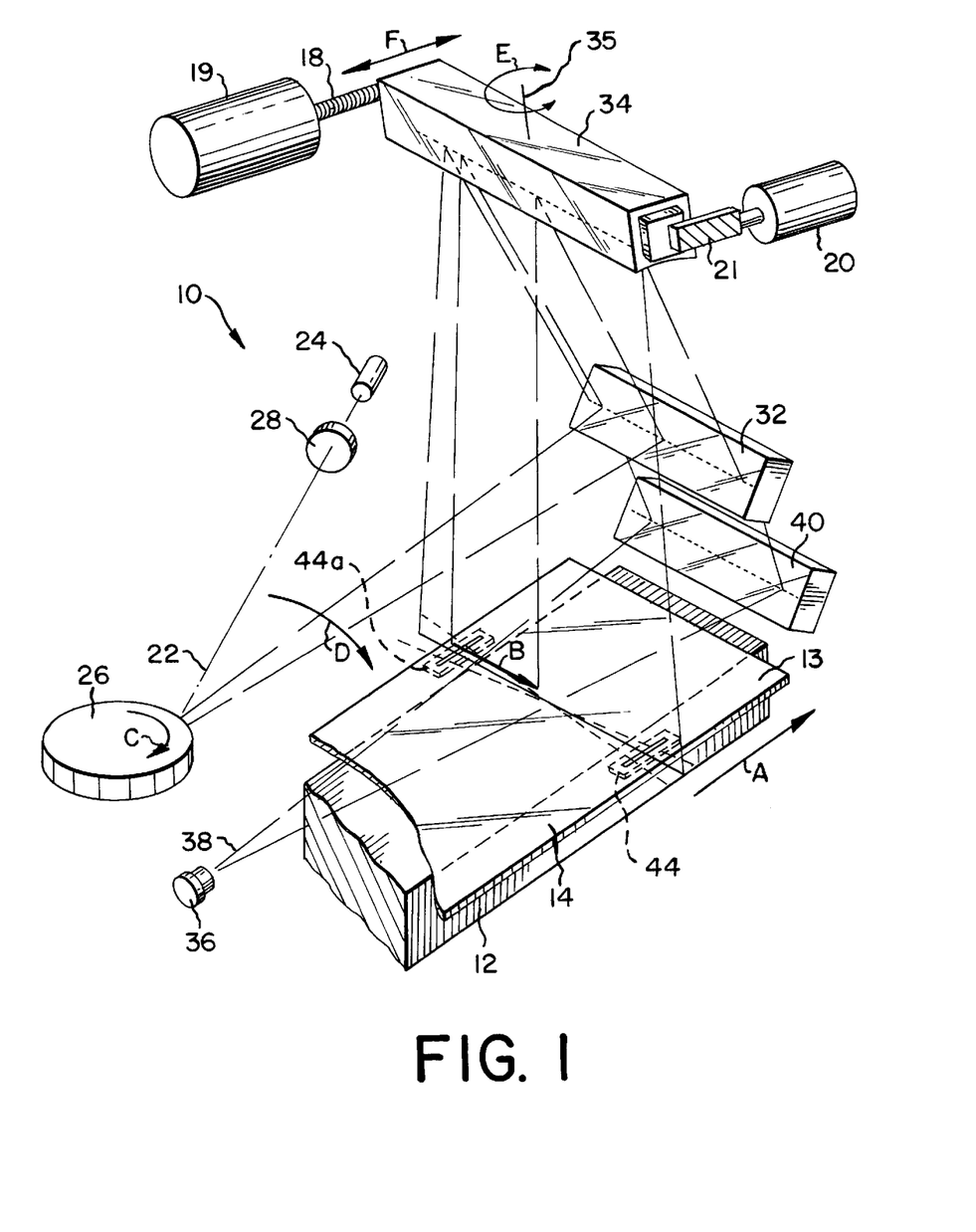
FIG. 1 is a schematic diagram of an apparatus employed to produce lenticular image products according to the present invention.

Referring to FIG. 1, lenticular image product production apparatus 10 includes a platen 12 for supporting lenticular material 14. Lenticular material 14 is placed with the lenticules down on the top of platen 12 so that the emulsion side 13 of the lenticular material 14 faces up. Further, the lenticular material 14 is made to overhang the platen 12 on both sides allowing fixed detectors 44 and 44a to be placed under the overhung edges of lenticular material 14. A suitable mounting structure (not shown) that fixedly mounts detectors 44 and 44a while transport platen 12 and lenticular material 14 move is provided to hold detectors 44 and 44a under the area where lenticular material 14 is exposed.

The lenticular material 14 is transported by platen 12 in the direction of arrow A by a linear transport system that is suitably driven, typically by a motor system (not shown) such as a direct drive linear motor or leadscrew. These drive systems are well understood and known in the art. The lenticular material 14 is exposed with a writing laser beam 22 from a modulated laser 24. The writing laser beam 22 is focused onto a scanning polygon 26 by optics 28. The scanning polygon 26 rotates in direction C causing the reflected writing laser beam 22 to scan in the D direction. The writing laser beam 22 is reflected from a cold mirror (reflects visible light and transmits infra red light) 32 onto pivotable cylinder mirror 34. Cylinder mirror 34 focuses the writing laser beam 22 onto the surface 13 of the lenticular material 14 thereby exposing the color photographic emulsion.

An infrared laser 36, located at a distance from the surface of the material identical to the distance to the scanning face of the polygon 26, forms a second beam of light 38, of a wavelength that can be transmitted through and which does not expose the lenticular material 14. The second beam of light is reflected by a IR turning mirror 40 through cold mirror 32 onto cylinder mirror 34. Cylinder mirror 34 focuses the second beam 38 onto the surface 13 of the lenticular material 14 in a line or two spots narrower than the width of a lenticule. Fixed detectors 44 and 44a are sensitive to the wavelength of second beam 38 and made insensitive to writing laser beam 22 by suitable filters placed over each detector during their manufacturing process. Second beam 38 passes through lenticular material 14 and is refracted by the lenticules of lenticular material 14 and impinge on fixed detectors 44 and 44a on either side of platen 12. Thus, the position of second beam 38 is sensed by detectors 44 and 44a relative to the lenticules of lenticular material 14.

Cylinder mirror 34 is mounted so that it is rotatable about a pivot axis 35 in the direction arrow E at the center of the scan line of writing laser beam 22. The pivoting cylinder mirror 34 rotates both the first and second laser beams 22 and 38 about pivot axis 35 and assures that the line of second beam 38 and the scan line of writing laser beam 22 are maintained parallel. The scanning polygon 26 works in conjunction with the pivoting cylinder mirror 34 to cause the writing laser beam 22 to scan the lenticular material in the direction of arrow B, parallel to the long cylindrical axes of the lenticules of lenticular material 14. The motion of the lenticular material 14 caused by platen 12 in the direction of arrow A provides scanning in the orthogonal or page scan direction.

Further, the angular position of pivoting mirror 34 is measured by position sensor 20 whose moving member 21 is fixedly mounted to the end portion of pivoting mirror 34. This sensor may be of any suitable type of position sensor known and employed in the art such as an LVDT, capacitive probe or potentiometer. At the other end of pivoting mirror 34 is attached a means for displacing or rotating the pivoting mirror 34. In this embodiment, a D.C. motor 19 and leadscrew 18 are employed to produced a controlled displacement of the end portion of pivoting mirror 34 in the direction of arrow F, and thus an angular displacement E about pivot axis 35. It can be appreciated by those skilled in the art that any number of other suitable means may employed to produce the same displacement including but not limited to, a cam actuator, voice coil or mechanical link. Thus, by the above described means, pivoting mirror 34 can be accurately controlled to change the angle of writing laser beam 22 and second beam 38 with respect to the lenticules on lenticular material 14 and therefore minimize any skew misalignment between them.

Figure 2:
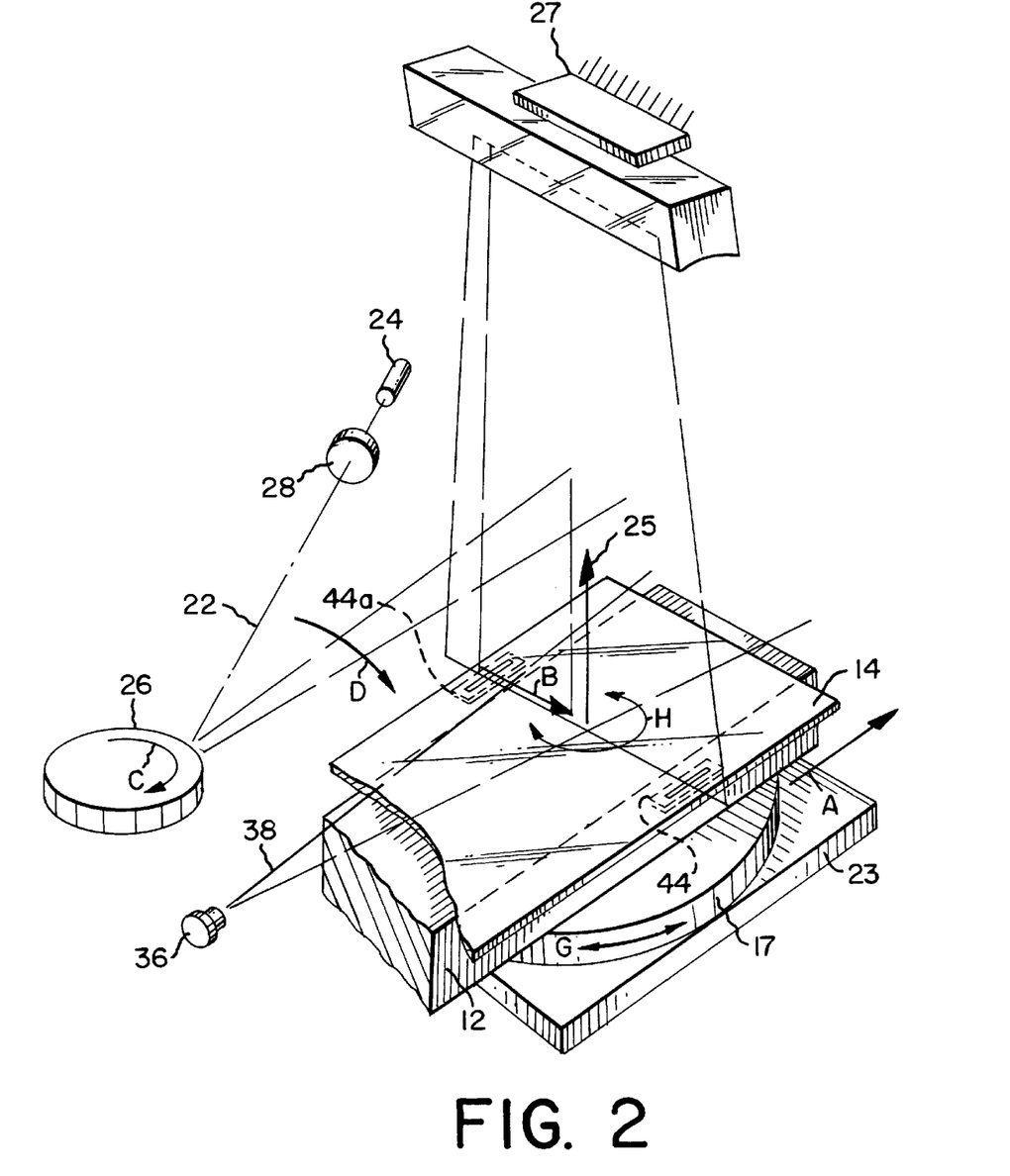
FIG. 2 is a schematic diagram of an alternate apparatus similar to FIG. 1, employed to produce lenticular image products according to the present invention.

FIG. 2 illustrates an alternate method for aligning a writing laser beam 22 and lenticular material 14. In this alternate method the optical elements described and depicted in FIG. 1 are the same but pivoting cylinder mirror 34 is held in a cylinder mirror fixed mount 27. Motor 19 and leadscrew 18 along with sensor 20 and its moving member 21 are not used. Movable platen 12 is mounted on a rotating mechanical stage 17 which is fixedly mounted on a rotational stage base 23. Rotational stage base 23 is transported in the direction A by the same type of linear transport means discussed in FIG. 1.

Rotational skew alignment of writing laser beam 22 to the lenticules of lenticular material 14 is accomplished by the rotational movement of rotating mechanical stage 17 in the indicated direction G. Movement of rotating mechanical stage 17 in direction G produces rotational movement of platen 12 and lenticular material 14 about the rotating mechanical stage axis 25 of rotating mechanical stage 17. Movement of lenticular material 14 about axis 25 changes the relative angular position of the lenticules of lenticular material 14 and writing laser beam 22 and second beam 38. The relative angular position of the lenticules of lenticular material 14 and second beam 38 is detected by fixedly mounted detectors 44 and 44a. Thus, the angular skew alignment of the lenticules of lenticular material 14 and writing laser beam 22 can be sensed and corrected to a minimum or any desired angular skew alignment by this means.

The means for rotational movement of rotating mechanical stage 17 can be any of the known means used in the art, such as: motor driven worm and pinion gear, lever arm or manual adjustment.

Figures 3A, 3B, 3C:
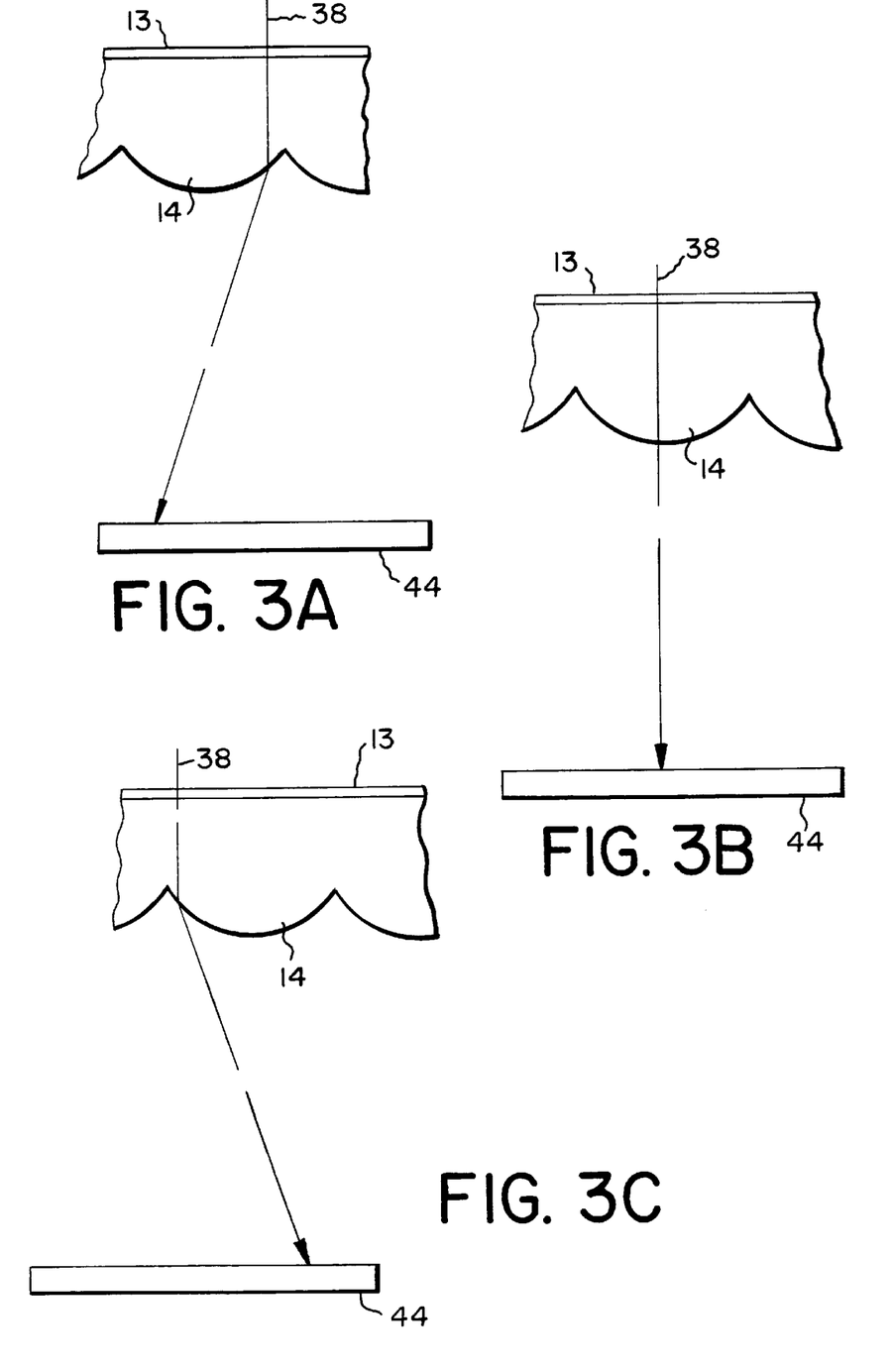
FIG. 3 is a schematic diagram illustrating the effect of the lenticular medium on the second beam of light.

Turning now to FIG. 3, illustrating how the lenticular material deflects the beam 38 of infra red light as it passes through different portions of one of the lenticular lenses in the lenticular material 14. Beam 38 is focused onto and is transmitted through the top layer 13 composed of a color photographic emulsion. As the beam 38 first encounters a lenticule, as shown in the illustration (A) on the left of FIG. 2, it is refracted at a large angle to the left and impinges on the left side of the position sensing detector 44. The angle depends upon the position of the lenticule with respect to the beam 38. When the beam is at the center of a lenticule (B), it is minimally deflected as shown in the illustration in the center and falls on the center of the position detector 44. As the lenticular material is moved further to the right, as shown in the illustration (C) on the right, the beam is deflected to the right and impinges on the right side of the position detector 44. The position detector 44 may be, for example, a PSD S3932 position sensitive detector available from Hamamatsu Photonics KK, Hamamatsu, Japan. However, any suitable photosensor means may be employed to detect the position of beam 38, including: split cell detectors, CCD image sensors and any other photosensors capable of sensing a relative position change of a spot or line of light.

Figure 4:
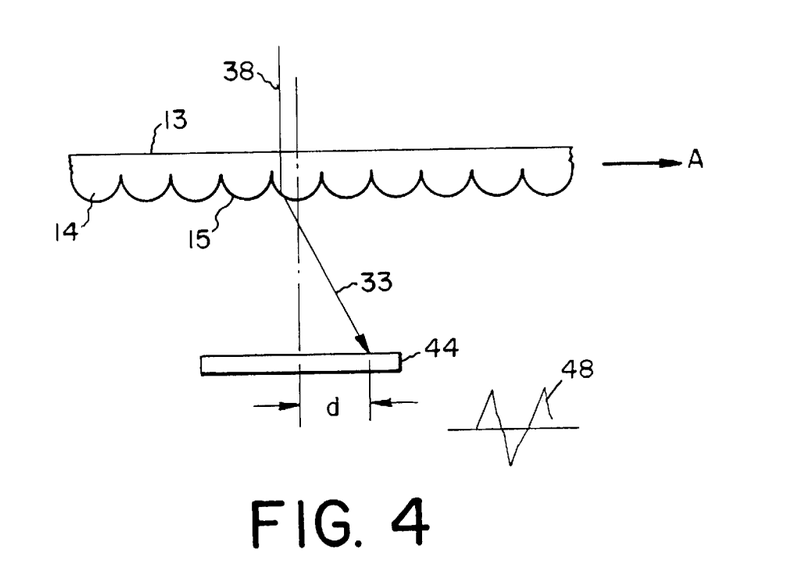
FIG. 4 shows details of the functionality of a position sensing detector 44.

Turning now to FIG. 4, there is shown further details of the functionality of the position sensing detector 44. A beam of light 38 is focused onto a top layer 13 of the lenticular material 14. The lenticular material 14 is moved relative to the beam 38 by a transport mechanism (not shown) in direction A. When the beam 38 passes through the curved surface 15 of the lenticular material 14 it refracts at a large angle. The centroid of the exiting beam 33 is axially displaced from the original beam 38 by a distance d. This distance d is measured by a position sensing detector 44. As the transport mechanism moves the lenticular material 14, the distance d changes. An output signal 48 is generated as the centroid of the exiting beam 33 is axially displaced from the original beam 38 by a distance d. Waveform 48 produced by position detector 44 is shown in FIG. 4.

Figure 5:
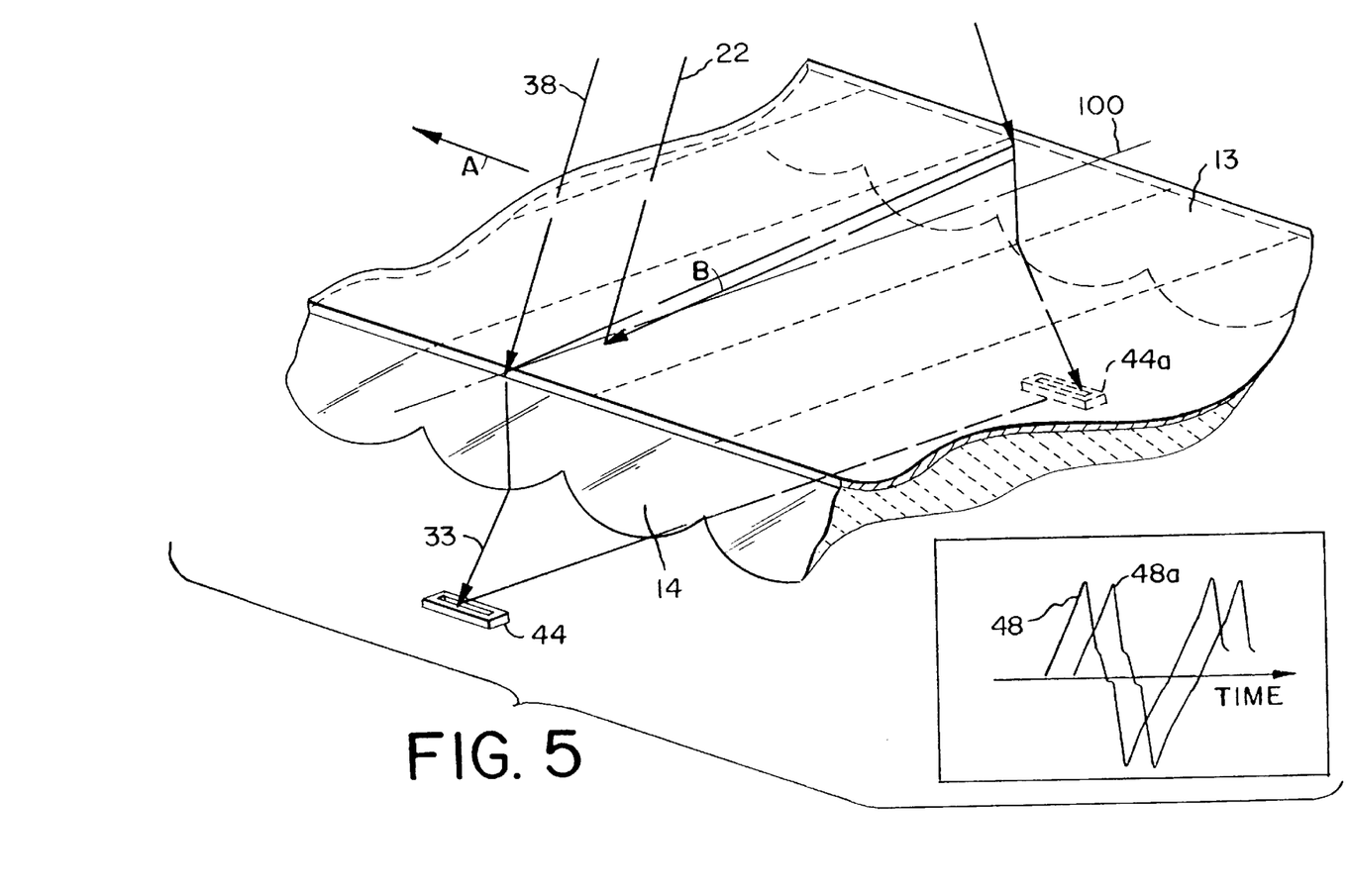

Referring now to FIG. 5, where the skew misalignment of the writing laser beam 22 and second beam 38 with respect to the lenticules is shown. Position sensing detectors 44 and 44a are shown in the correct orientation for detecting this skew misalignment. As the lenticular material 14 is transported in direction A, the second beam 38 is transmitted through the lenses of the lenticules and refracted resulting in the generation of output signals 48 and 48a by detectors 44 and 44a. Due the fact that the second beam 38 is misaligned relative to the long axis of the lenticule 100, the position of the refracted beam 33 is different at each detector, causing waveforms 48 and 48a to be positionally out of phase.

Referring now to FIG. 6 showing three sets of output signals 48 and 48a and the resulting relative phase position between them that occurs for different amounts of skew misalignment between second beam 38 and long axis 100 of the lenticule lens onto which it is directed. FIG. 6 depicts a top view of a lenticule and second beam 38 that creates the resulting output waveforms 48 and 48a from position sensing detectors 44 and 44a for three cases of skew alignment.

Figure 6A:
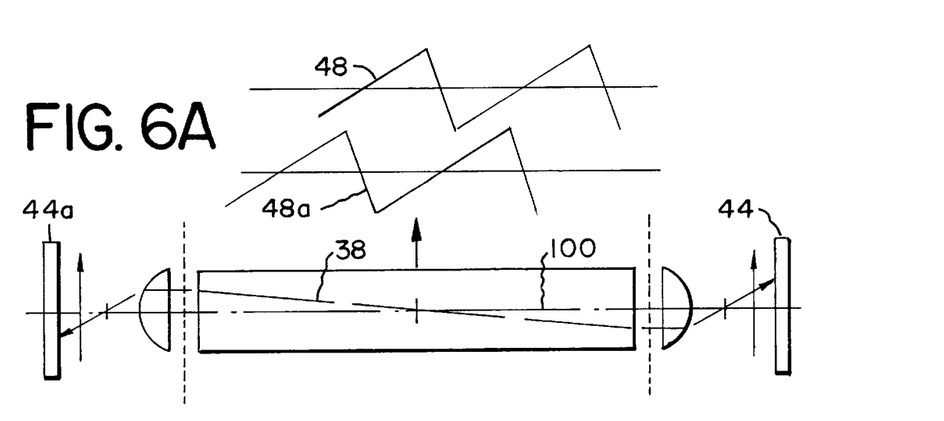
FIG. 6 shows three sets of output signals 48 and 48a and the resulting relative phase position between them that occurs for different amounts of skew misalignment between second beam 38 and the long axis center 100 of the lenticule lens onto which it is directed.

FIG. 6a shows a clockwise skew misalignment between the second beam 38 and the long axis 100 of the lenticule. This misalignment is measured by the relative phase shift between the output signals 48 and 48a. As shown, 48a leads 48, signifying clockwise skew misalignment between second beam 38 and long axis 100 of the lenticule lens.

Figure 6B:
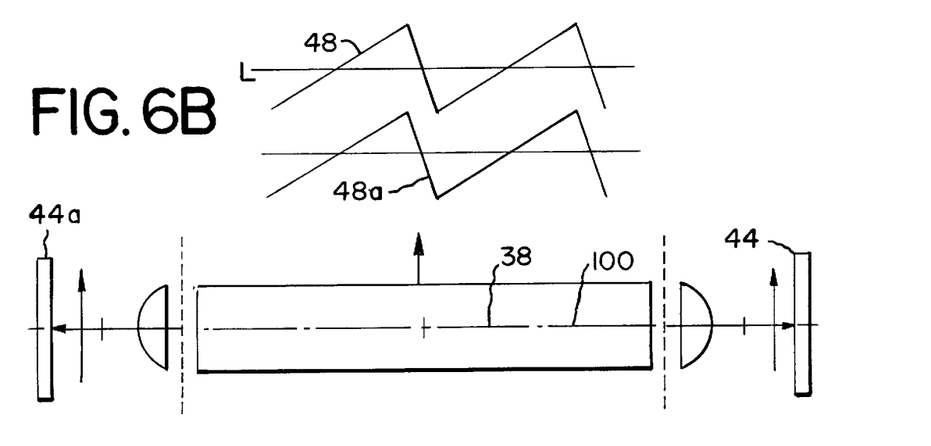

FIG. 6b shows no skew misalignment between the second beam 38 and the long axis 100 of the lenticule. As shown, 48a is in phase with 48, signifying no skew misalignment between second beam 38 and long axis 100 of the lenticule lens.

Figure 6C:
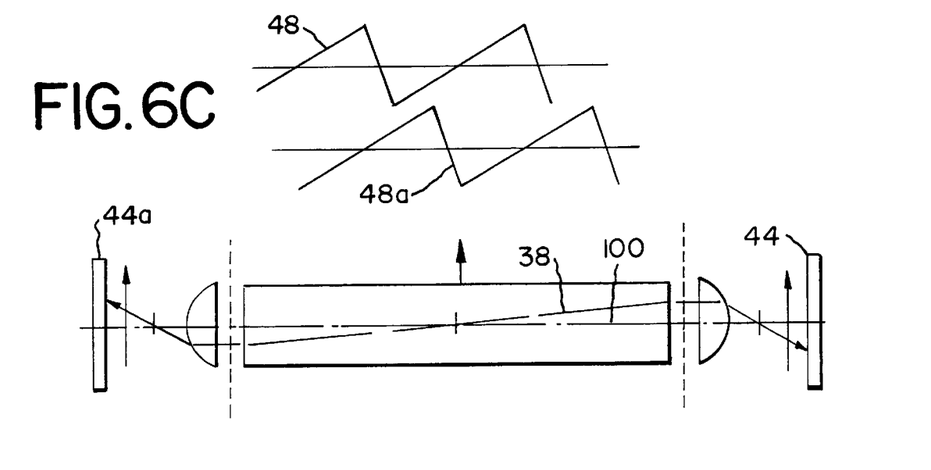

FIG. 6c shows a counter-clockwise skew misalignment between the 30 second beam 38 and the long axis 100 of the lenticule. This misalignment is measured by the relative phase shift between the output signals 48 and 48a. As shown, 48a lags 48, signifying counter-clockwise skew misalignment between second beam 38 and long axis 100 of the lenticule lens.

Thus, the system as described, is capable of generating electrical signals which represent, by their phase difference, the degree of angular skew alignment between the second beam 38 and the long axis 100 of the lenticular material 14. Initial pre-alignment of detectors 44 and 44a are required in order to assure that the generated electrical signals have the desired phase difference when second beam 38 and long axis 100 are parallel aligned This is accomplished by removal of lenticular material 14 to ensure that second beam 38 is undeflected by the lenticules of lenticular material 14 and moving either detector relative to the other, in the direction of arrow A, to produce the desired output voltage equivalent to waveforms 48 and 48a desired phase difference.

Figure 7:
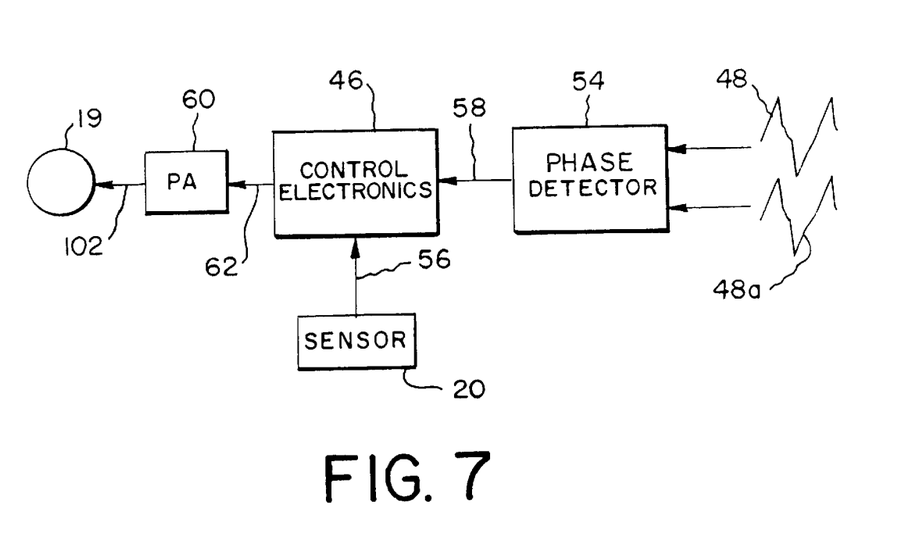
FIG. 7 is a schematic diagram illustrating the apparatus for processing the output signals 48 and 48a to generate a correction signal for controlling the position of the pivoting cylinder mirror.

Referring to FIG. 7, the control electronics is shown detail. Output signals 48 and 48a, from position sensing detectors 44 and 44a, are input to the phase detection means 54. Phase detection means 54 can be of any of the known phase detection means understood and known in the art. A typical method might measure the time difference between the zero crossings of waveforms 48 and 48a and convert this to a voltage using a charge pump technique. The resultant phase difference signal 58 is input to the control electronics 46. The output 58 of the phase detection means 54 represents the degree of skew between the lenticular long axis 100 and, the writing laser beam 22 and second beam 38. The control electronics generates a control signal 62 which is directed to power amplifier 60 to generate a drive signal 102 to drive the pivoting cylinder mirror motor 19. The control electronics 46 also receives a position feedback signal 56 from the pivoting cylinder mirror position sensor 20 that monitors the angular position of the pivoting cylinder mirror 34. This position feedback signal 56 is used by the control electronics 46 to enhance the stability of the servo system.

Figure 8:
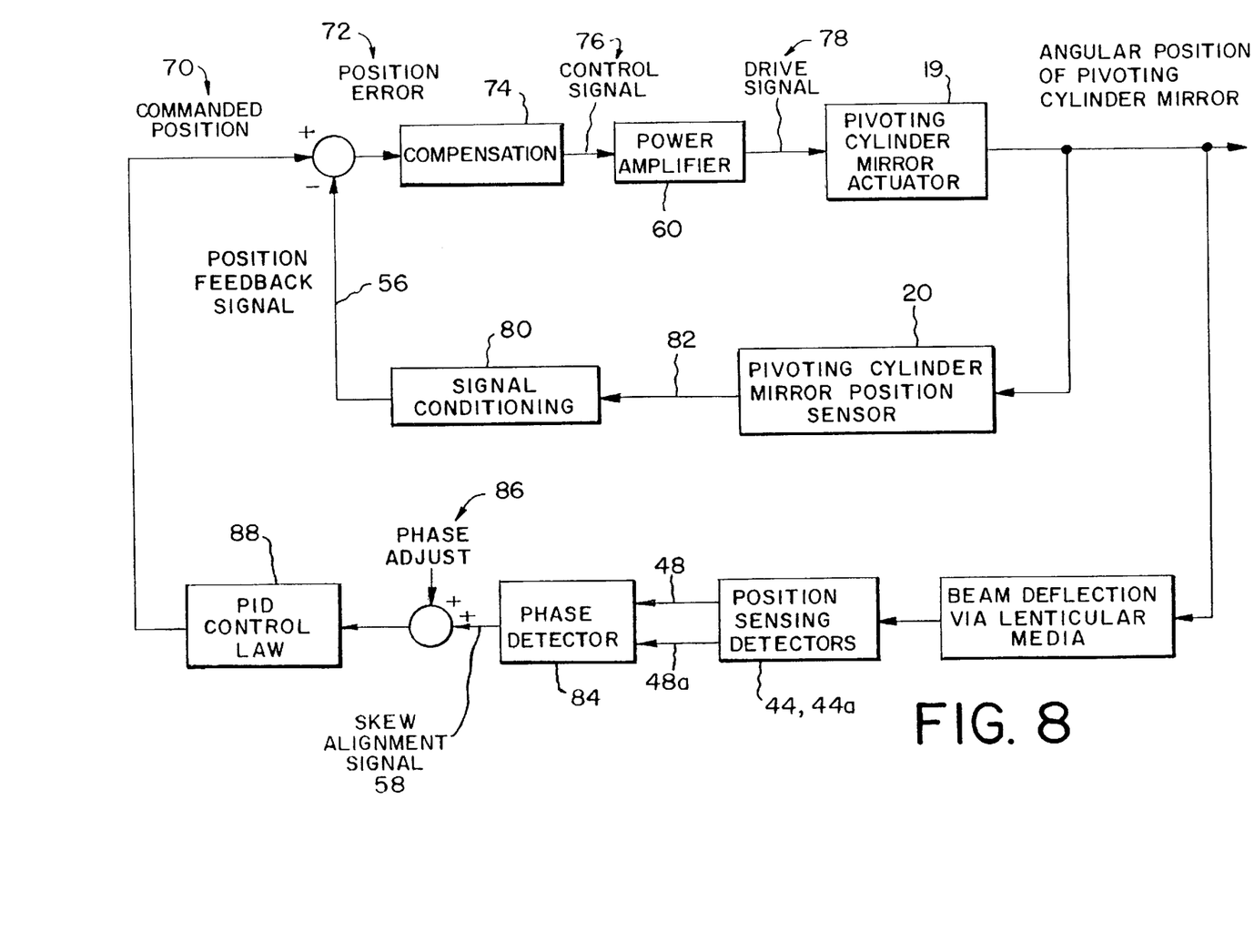
FIG. 8 is a schematic diagram illustrating, in further detail, the apparatus for processing the output signals 48 and 48a to generate a correction signal for controlling the position of the pivoting cylinder mirror.

Referring to FIG. 8, the control electronics is shown in further detail as a control system block diagram. The control system is a dual loop system. The inner loop seeks to track the commanded position 70. The commanded position 70 is summed with the position feedback signal 56 to generate the position error signal 72. This position error signal is acted upon by compensation electronics 74 to generate a control signal 76. This control signal 76 is directed to the power amplifier 60 which creates the pivoting cylinder mirror drive signal 78. The pivoting cylinder mirror drive signal causes the pivoting cylinder mirror actuator (pivoting cylinder mirror actuator includes pivoting cylinder mirror 34, pivoting cylinder mirror motor 19, leadscrew 18, pivoting cylinder mirror position sensor 20 and moving member 21) to rotate, thus changing the angular position of the pivoting cylinder mirror 34. The angular position, of the pivoting cylinder mirror 34, is sensed by the pivoting cylinder mirror position sensor 20. The output 82 of the pivoting cylinder mirror position sensor 20 is filtered and gain adjusted in the signal conditioning block 80 to produce the position feedback signal 56. The outer loop provides the commanded position 70. The commanded position 70 is generated by the deflection of beam 38 through the lenticular material 14. The misalignment between the second beam 38 and the long axis 100 of the lenticule is detected by the position sensing detectors 44 and 44a and is represented by the relative phase shift between the output signals 48 and 48a. The relative phase difference signal 58 between the output signal 48 and 48a, is discriminated by the phase detector 84. The relative phase is summed with the phase adjust input 86 and applied to PID control law electronics 88. The use of PID control laws in system control is well known in the art. The output of this electronics is the commanded position 70. The phase adjust signal 86 can be added as an additional offset to the phase difference 58 in order to introduce a known constant skew offset to compensate for the raster skew of the writing laser beam 22.

In an alternate embodiment, the platen 12 may be constructed entirely of glass (not shown) or some other transparent material such that the lenticular material 14 can be fully supported and the beam 38 can pass through the transparent material and impinge upon detectors 44 and 44a.

Figure 9:
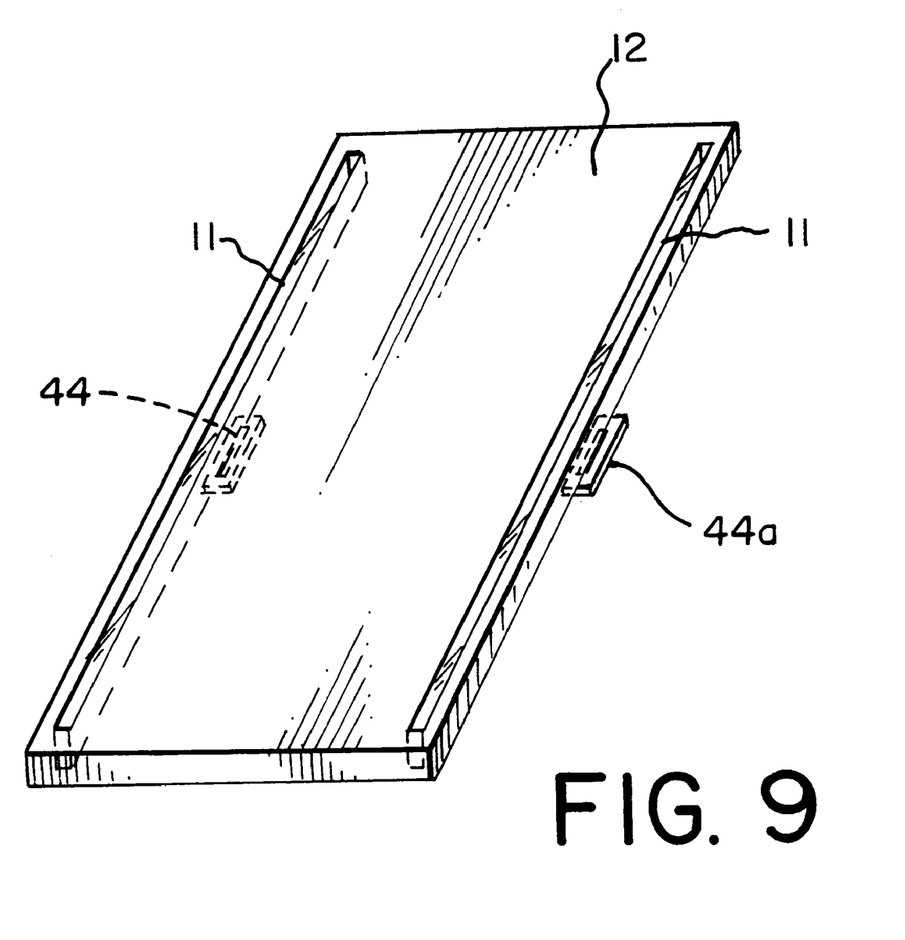
FIG. 9 is a schematic diagram illustrating, an alternate embodiment of the present invention with variations on the method of supporting the lenticule material.

Referring to FIG. 9, in a further alternate embodiment, the platen 12 may be constructed of a material other than glass but includes narrow transparent inserts 11 along the full length of the lenticular material 14. The transparent inserts 11 need only be sufficiently wide so that the beam can pass through to the detectors 44 and 44a. The transparent inserts 11, if used must be positioned so that the fixed detectors 44 and 44a will receive the deflected beam 38.

The invention has been described with reference to a preferred embodiment; however, it will be appreciated that variations and modifications can be effected by a person of ordinary skill in the art without departing from the scope of the invention.

PARTS LIST 10 lenticular image product production apparatus
11 transparent inserts
12 platen
13 top layer of lenticular material
14 lenticular material
15 curved surface of the lenticular material
17 rotating mechanical stage
18 leadscrew
19 pivoting cylinder mirror motor
20 pivoting cylinder mirror position sensor
21 moving member
22 writing laser beam
23 rotational stage base
24 modulated laser
25 rotating mechanical stage axis
26 polygon
27 cylinder mirror fixed mount
28 optics
32 cold mirror
33 exiting beam
34 pivoting cylinder mirror
35 pivot axis
36 infrared laser
38 second beam of light
40 IR turning mirror
44 position sensing detector
46 control electronics
48 angular displacement signal
56 position feedback signal
58 phase difference signal
60 power amplifier
62 control signal
70 commanded position
72 position error
74 compensation
76 control signal
78 pivoting cylinder mirror drive signal
80 signal conditioning electronics
82 output of the pivoting cylinder mirror position sensor
84 phase detector
86 phase adjust input
88 PID control law electronics
100 the long axis of the lenticule lens
102 drive signal

What is claimed is:

1. A method of detecting the relative skew between a reference beam and transparent lenticular material of the type having a repeating pattern of cylindrical lenses, comprising the steps of:

forming a beam of light;

focusing the beam of light into at least two distinct spots or a line both with a width smaller than the pitch of the cylindrical lenses onto the lenticular material;

moving the lenticular material relative to the beam in a direction such that the beam crosses the long axes of the cylindrical lenses to modulate the angle of reflection or refraction of the beam of light; and sensing the position of the modulated beam of light into at least two distinct points separated along the long axes of the cylindrical lenses to determine the skew or relative angular location of lenticular material to the focused spots or line.

2. The method of claim 1, further comprising the steps of:

directing the beam of light onto the lenticular material via a pivoting cylinder mirror;

providing an actuator to cause the rotation of the pivoting cylinder mirror;

providing a position sensor to detect the rotational position of the pivoting cylinder mirror;

converting the sensed skew or relative angular location between the beam and the longitudinal axis of the lenticular material to a correction signal;

generating a commanded position based upon a PID control law; and providing the commanded position as an input to a position control system to minimize the skew between the beam and the longitudinal axis of the lenticular material by moving the pivoting cylinder mirror.

3. The method of claim 2, further comprising the steps of:

controlling the motion of the pivoting cylinder mirror such that the lenticular material passes through the beam with the longitudinal axis of the lenticules parallel to the beam of light.

4. The method of claim 1, further comprising the steps of:

moving the lenticular material past the beam of light;

using a roller platen or flat platen with a width less than that of the lenticular material to support the lenticular material such that the lenticular material overhangs beyond the width of the platen;

detecting the deflection of the beam of light in the region of the lenticular material that overhangs beyond the width of the platen.

5. The method of claim 1, further comprising the steps of:

moving the lenticular material past the beam of light;

using a roller platen or flat platen with a width equal to or greater than that of the lenticular material to support the lenticular material such that the lenticular material is fully supported to the edges by the platen;

constructing the platen of a transparent material; and detecting the deflection of the beam of light after it has passed through the transparent platen.

6. The method of claim 1, further comprising the steps of:
moving the lenticular material past the beam of light;
using a flat platen with a width equal to or greater than that of the lenticular material to support the lenticular material such that the lenticular material is fully supported to the edges by the platen;
constructing the platen of an opaque material;
including strips of transparent material inserted into and along the length of the platen on both sides located directly above the detectors for detecting the deflection of the beam of light; and
detecting the deflection of the beam of light after it has passed through the transparent strips within the platen.

7. The method of claim 1, further comprising the steps of:
moving the lenticular material past the beam of light;
using a flat platen with a width equal to or greater than that of the lenticular material to support the lenticular material such that the lenticular material is fully supported to the edges by the platen;
constructing the platen of an opaque material;
including cutout areas within and along the length of the platen on both sides located directly above the detectors for detecting the deflection of the beam of light; and
detecting the deflection of the beam of light after it has passed through the cutout areas within the platen.

8. The method of claim 1, wherein the lenticular material includes a photographic emulsion sensitive to a range of wavelengths and wherein the wavelength of the beam of light is outside of the range of emulsion sensitivity.

9. The method of claim 1, wherein the position of the modulated beam of light is sensed by a photosensor.

10. A method of detecting the relative skew between a reference beam and transparent lenticular material of the type having a repeating pattern of cylindrical lenses, comprising the steps of:
forming a beam of light;
focusing the beam of light into at least two distinct spots or a line both with a width smaller than the pitch of the cylindrical lenses onto the lenticular material;
holding the lenticular material on a roller platen or flat platen such that the material overhangs the platen on each edge in the reference beam direction;
moving the lenticular material relative to the beam in a direction such that the beam crosses the long axes of the cylindrical lenses to modulate the angle of reflection or refraction of the beam of light; and
sensing the position of the modulated beam of light into at least two distinct points separated along the long axes of the cylindrical lenses to determine the skew or relative angular location of lenticular material to the focused spots or line.

11. The method of claim 10, further comprising the steps of:
directing the beam of light onto the lenticular material via a fixed cylinder mirror;
providing an actuator to cause the rotation of the platen;
providing a position sensor to detect the rotational position of the platen;
converting the sensed skew or relative angular location between the beam and the longitudinal axis of the lenticular material to a correction signal;
generating a commanded position based upon a PID control law; and
providing the commanded position as an input to a position control system to minimize the skew between the beam and the longitudinal axis of the lenticular material by moving the platen.

12. A method of forming a lenticular image product, comprising the steps of:
providing a lenticular material having an array of cylindrical lenses and a photographic emulsion coated thereon;
scanning the lenticular material with an intensity modulated first beam of light in a direction parallel to the long axes of the cylindrical lenses to form a latent lenticular image in the photographic emulsion;
focusing a second beam of light having a wavelength outside of the range of sensitivity of the photographic emulsion into two distinct spots or a line both with a width smaller than the pitch of the cylindrical lenses onto the lenticular material;
moving the lenticular material in a direction nearly perpendicular to the axes of the cylindrical lenses to provide a page scan motion of the lenticular material and to modulate the angel of reflection or refraction of the second beam of light;
directing said first and second beams of light onto said lenticular material with a pivoting cylinder mirror;
sensing the position of the angularly modulated second beam of light to control the rotation of the pivoting cylinder mirror; and
using the angular position of the pivoting cylinder mirror to modify the angular relationship between the first and second beams of light and the lenticular material.

13. The method of claim 12, wherein the position of the modulated beam of light is sensed by a photosensor.

14. A lenticular image product produced by the method of claim 12.

15. A method of forming a lenticular image product, comprising the steps of:
providing a lenticular material having an array of cylindrical lenses and a photographic emulsion coated thereon on a rotatable pattern;
scanning the lenticular material with an intensity modulated first beam of light in a direction parallel to the long axes of the cylindrical lenses to form a latent lenticular image in the photographic emulsion;
focusing a second beam of light having a wavelength outside of the range of sensitivity of the photographic emulsion into two distinct spots or a line both with a width smaller than the pitch of the cylindrical lenses onto the lenticular material;
moving the lenticular material in a direction nearly perpendicular to the axes of the cylindrical lenses to provide a page scan motion of the lenticular material and to modulate the angle of reflection or refraction of the second beam of light;
sensing the position of the angularly modulated second beam of light to control the rotation of the platen; and
using the angular position of the platen to modify the angular relationship between the first and second beams of light and the lenticular material.

16. The method of claim 15, wherein the position of the modulated beam of light is sensed by a photosensor.

17. A lenticular image product produced by the method of claim 15.

18. Apparatus for forming a lenticular image product from a lenticular material having an array of cylindrical lenses and a photographic emulsion coated thereon, comprising:

means for scanning the lenticular material with an intensity modulated first beam of light in a direction parallel to the long axes of the cylindrical lenses to form a latent lenticular image in the photographic emulsion;

means for focusing a second beam of light having a wavelength outside of the range of sensitivity of the photographic emulsion into at least two distinct spots or a line both with a width smaller than the pitch of the cylindrical lenses onto the lenticular material;

means for moving the lenticular material beam in a direction nearly perpendicular to the axes of the cylindrical lenses provide a page scan motion of the lenticular material and to modulate the angle of reflection or refraction of the second beam of light;

directing said first and second beams of light onto said lenticular material with a pivoting cylindrical mirror;

means for sensing the position of the angularly modulated second beam of light to control the motion of the pivoting cylinder mirror; and means for using the position of the pivoting cylinder mirror to modify the angular relationship between the first and second beams of light and the lenticular material.

19. The method of claim 18 further comprising:

means for controlling the motion of the pivoting cylinder mirror such that a the lenticular material passes through the beam with the longitudinal axis of the lenticules perpendicular to the beam of light.

20. The method of claim 18, wherein the position of the modulated beam of light is sensed by a photosensor.

21. Apparatus for forming a lenticular image product from a lenticular having an array of cylindrical lenses and a photographic emulsion coated thereon, comprising:

means for scanning the lenticular material supported on a rotatable platen with an intensity modulated first beam of light in a direction parallel to the long axes of the cylindrical lenses to form a latent lenticular image in the photographic emulsion;

means for focusing a second beam of light having a wavelength outside of the range of sensitivity of the photographic emulsion into at least two distinct spots or a line both with a width smaller than the pitch of the cylindrical lenses onto the lenticular material;

means for moving the lenticular material beam in a direction nearly perpendicular to the axes of the cylindrical lenses provide a page scan motion of the lenticular material and to modulate the angle of reflection or refraction of the second beam of light;

means for sensing the position of the angularly modulated second beam of light to control the rotation of the platen; and means for using the angular position of the platen to modify the angular relationship between the first and second beams of light and the lenticular material.

22. The method of claim 21 further comprising:

directing said first and second beams of light onto said lenticular material with a pivoting cylinder mirror; and controlling the motion of the pivoting cylinder mirror such that the lenticular material passes through the beam with the longitudinal axis of the lenticules perpendicular to the beam of light.

23. The method of claim 21, wherein the position of the modulated beam of light is sensed by a photosensor.

* * * * *